E. JAMES.
FLEXIBLE TUBE CONNECTION.
APPLICATION FILED SEPT. 21, 1908.
1,148,090.
Patented July 27, 1915.
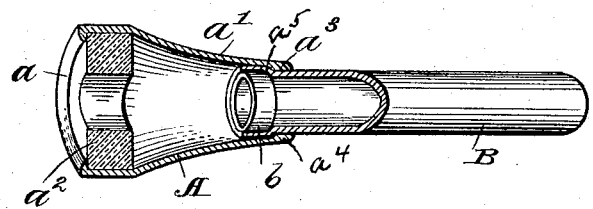
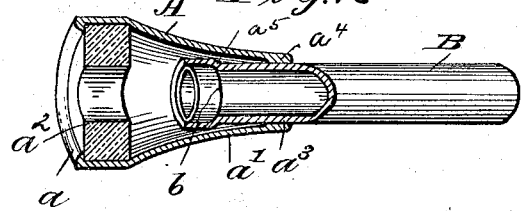
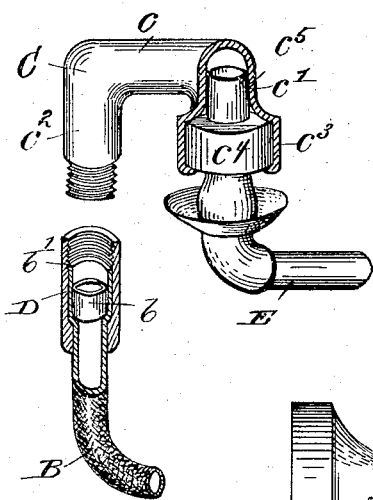
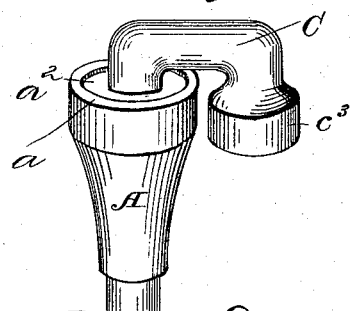
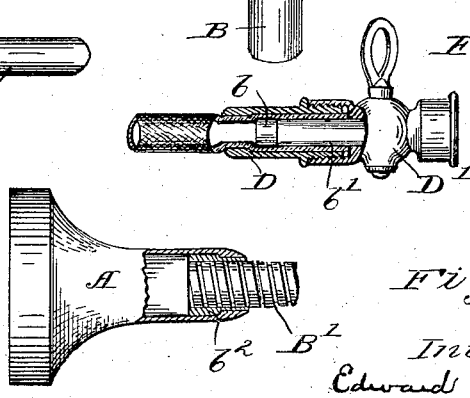
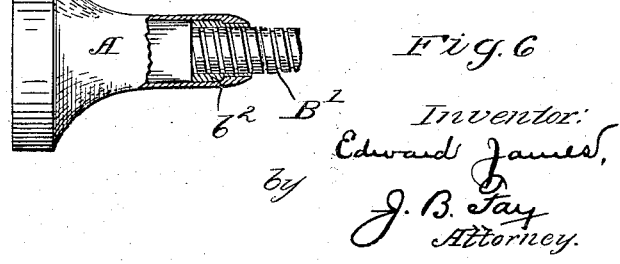
Witnesses:
J. C. Turner
Jno. F. Oberlin
Inventor:
Edward James,
by J. B. Fay
Attorney.

UNITED STATES PATENT OFFICE.

EDWARD JAMES, OF CLEVELAND, OHIO, ASSIGNOR TO THE JAMES MANUFACTURING COMPANY, OF CLEVELAND, OHIO, A CORPORATION OF OHIO.

FLEXIBLE-TUBE CONNECTION.

1,148,090.  Specification of Letters Patent.  Patented July 27, 1915.

Application filed September 21, 1908. Serial No. 453,979.

*To all whom it may concern:*

Be it known that I, EDWARD JAMES, citizen of the United States, resident of Cleveland, county of Cuyahoga, and State of Ohio, have invented a new and useful Improvement in Flexible-Tube Connections, of which the following is a specification, the principle of the invention being herein explained and the best mode in which I have contemplated applying that principle, so as to distinguish it from other inventions.

My invention relating, as indicated, to flexible tube connections has more particular regard to connections for conducting gas, as for instance drop light connections and the like, but as will be obvious various features of construction involved in the disclosure are equally adaptable where it becomes necessary to secure a flexible tube, as of rubber, to a metallic or like rigid connecting member.

The object of the invention is the provision of connections of the class in hand that will be practical and economical in construction and withal pleasing and ornamental in appearance.

To the accomplishment of the foregoing objects, said invention then consists of the means hereinafter fully described and particularly pointed out in the claims.

The annexed drawing and the following description set forth in detail certain mechanism embodying the invention, such disclosed means constituting, however, but several of the various mechanical forms in which the principle of the invention may be used.

In said annexed drawing: Figure 1 represents in sectional view a connecting member, or coupling, to one end of which is secured a flexible tube in accordance with the present invention; Fig. 2 is a view similar to Fig. 1, illustrating the manner of thus securing said tube to the coupling member; Fig. 3 is a view, partly in side elevation and partly in section, illustrating another adaptation of such connection, together with a "goose-neck" for use in securing the tube to a gas fixture; Fig. 4 illustrates the use of such "goose-neck" in a slightly different fashion; Fig. 5 illustrates another adaptation of the connecting member and joint; and Fig. 6 illustrates the application of my mode of connecting tubes to such connecting members, where the tube itself is not expansible as in the case of the tubing illustrated in the preceding figures.

Said member will be seen to comprise a metal casing A having an inturned flange $a$ at one end and a tapering tubular extension $a'$ at the other provided with an internal annular shoulder $a^4$; seated within the enlarged flanged end is an annular disk or thick washer $a^2$ of elastic material, preferably rubber, the opening in said disk being designed to receive the end of a stove or wall cock of some other connection for the transmission of fluid, as for example the "goose-neck" C, illustrated in Fig. 4. This portion $a'$ of the casing, while tapering in form, does not incline very sharply from the cylindrical seat, wherein washer $a^2$ is held, so that the latter may be rotated within the casing about a transverse axis. As a result the insertion and removal of such washer is very much facilitated as will be readily understood. Preferably the opening $a^3$ in the tapering extension $a'$ is slightly contracted, and fitted in such contracted opening is the end of the hose or rubber tube B that is to be connected with such casing. Moreover, whereas the general conformation of member A is tapering, the portion thereof immediately adjacent to such contracted opening $a^3$ is made substantially straight for a reason that will presently appear. To secure the tube's end in the extension I employ an annular element or bushing $b$, preferably of metal, and of such diameter that when fitted within the hose end it will distend the same forming a shoulder $a^5$, and prevent removal of the tube through the contracted opening of the casing. To insert such ring I simply project the end of the tube well within the enlarged portion of the casing, then insert the annular member or bead, which may be readily done (see Fig. 2) and finally pull the tube and casing apart until said member is firmly seated in the contracted portion of the extension. A very tight joint is thus initially had, preventing any possibility of the hose being ejected or separated from the casing, while the passage of liquid therethrough, by providing an excess of pressure against the inner side of the tube tends to press it tighter against the casing as the pressure increases. At the same time it should be noted that the effect of the straight section of the member A adjacent to opening $a^3$ is to eliminate the tendency of the bead $b$ to spring or work back, as is the case where the member tapers throughout its entire length.

I illustrate in Figs. 3 and 5 the utilization of this same mode of connecting the tube to a casing D where the casing is of slightly different construction, being a threaded coupling member instead of a connection of the sort previously described. I further illustrate in these two figures just named a device for securing an effective joint between the two threaded members, such detail consisting simply in a portion $b'$ of the same tube that is allowed to extend beyond the annular wedging member $b$, the latter being inserted farther into the tube than in the first instance. The effect of the member $b$, of course, will be just the same, but the extending part $b'$ of the tube will contact either with the end of the other coupling member, where the latter is of the form shown in Fig. 3, or with a shoulder formed thereon for this purpose, a member D' of the latter character being illustrated in Fig. 5. There is hence but a single joint in the connection through which fluid can escape, viz. between the end of the tube and the end of the other coupling member, but this joint obviously can be made quite tight and secure by drawing the threaded members together. If desired instead of a prolongation of the tube itself, a short section will serve.

Where it is desired to secure to a connection, tubing B' of the flexible metallic construction that has lately come into use, consisting of superposed spirals so overlapped and connected as to form a fluid tight tube, a slight modification in my invention is necessary since the end of such tube, is not adapted to be distended into contact with the walls of the casing. I accordingly place a short section of tubing or ring of elastic material, $b^2$ about the end of the tube B' and then draw this down into the contracted portion of the connection. In effect, as will hence be obvious, the tube acts as the bead in the previous instance and the elastic ring functions as the end of the former elastic tube.

The "goose-neck" C which I design to employ in conjunction with the foregoing connecting elements, I form of an integral casting comprising two short parallel portions $c'$ $c^2$ joined by a sharply rectangularly disposed portion $c$ so as to provide a very compact structure, instead of the usual structure composed of several extended pieces threaded together. Of the two parallel portions the one $c^2$ is threaded externally so as to be adapted to be secured into a connection D of the type illustrated in conjunction therewith in Fig. 3, but to permit of its insertion in a connection A of the type illustrated in Figs. 1 and 2 as shown in Fig. 4, should this be more convenient or desirable. The other parallel portion $c'$ of the "goose-neck" is enlarged so as to provide a bell-like terminal $c^3$ within which is secured, as in the other type of connection, a washer or disk $c^4$ of rubber. The contracted, or normal, opening $c^5$ in such portion of the "goose-neck" is designed in use to receive the end or tip of the gas fixture E, while washer $c^4$ engages such fixture at a point removed from its end. By means of this two-fold engagement the "goose-neck" is very rigidly held upon the fixture, any wabbling tendency being effectually overcome by the engagement at $c^5$, while the disk of course affords a gas tight joint at the lower point where it engages the fixture.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In apparatus of the class described, the combination of a tubular casing having one end smaller than the other, the opening at the smaller end of said casing having an internal annular shoulder and being contracted to a diameter less than that of the remainder of the casing, and the portion of the inner peripheral wall of said casing adjacent to such small end being substantially straight; a hose fitted to such opening and projecting within said casing; and a non-expansible annular member fitted within such hose-end, the latter with such member therein being drawn longitudinally so as to compress such hose-end against the straight portion of such casing and form an annular shoulder on the hose to prevent the removal of such end through such opening.

2. In an apparatus of the class described, the combination of a tubular casing having one end smaller than the other, the opening at the smaller end of said casing having an internal annular shoulder and being contracted to a diameter less than that of the remainder of the casing, and the portion of the inner peripheral wall of said casing adjacent to such small end being substantially straight; a hose fitted to such opening and projecting within said casing; and a non-expansible ring of substantially cylindrical form fitted within the mouth of the hose, the external diameter of such ring being larger than the internal diameter of the hose whereby the end of the latter is distended, and such distended hose-end, with such ring therein, being drawn longitudinally so as to compress such hose-end against the straight portion of said casing and form an annular shoulder on the hose to prevent removal of such end through such opening.

Signed by me this 18th day of August, 1908.

EDWARD JAMES.

Attested by—
D. T. DAVIES,
JNO. T. OBERLIN.

Copies of this patent may be obtained for five cents each, by addressing the "Commissioner of Patents, Washington, D. C."